Nov. 22, 1966  C. E. DEAN  3,286,380
CUSTOMER SERVICE DEVICE
Filed Feb. 18, 1964
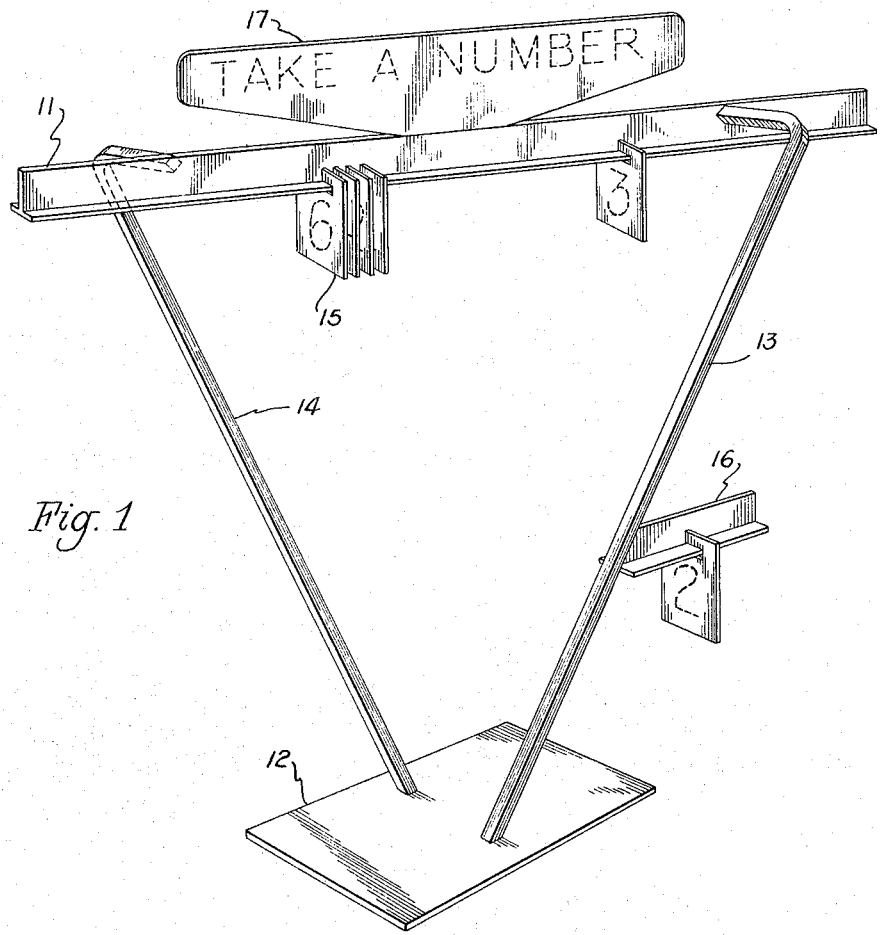
Fig. 1
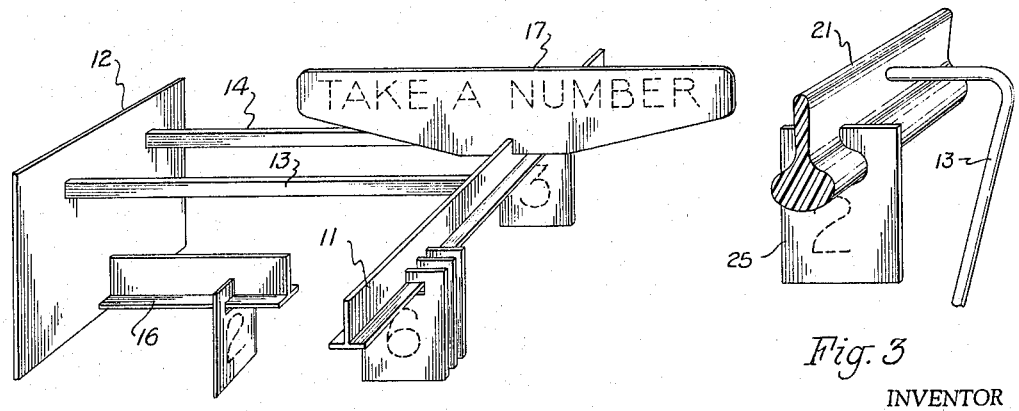
Fig. 2
Fig. 3
INVENTOR
Charles E. Dean
BY
*Glenn S. Overvik*
AGENT

United States Patent Office 3,286,380
Patented Nov. 22, 1966

3,286,380
CUSTOMER SERVICE DEVICE
Charles E. Dean, 3807 Estel Road, Fairfax, Va.
Filed Feb. 18, 1964, Ser. No. 345,769
1 Claim. (Cl. 40—19.5)

This invention relates in general to customer service devices and in particular to devices for regulating the order in which service is to be provided.

Customer service devices, irrespective their nature, should provide service in a manner which is fair and reasonable in the eyes of the public. This is a requirement of utmost importance in customer service systems for determination of the order of service. Many such systems involve numbered chits of various description which are distributed to the customers as they seek service by one of a number of different chit dispensing means. In most instances, an auxiliary numbering means is employed in conjunction with the chits to indicate to the clerk and to the customer, as well, which number is currently being served or was last called. Generally printed paper chits designed for single use are employed and these paper chits are merely torn from a simple tablet means by the customer while the clerk operates a consecutively numbered display device of a more durable nature.

Other more elaborate and costly systems utilize durable chits along with a durable number display device. A few systems of the prior art employ a durable chit in a dual capacity, that is, the chit is adapted for both customer holding and clerk display, as well. In this dual capacity system, the chits may be stacked in a pile on a spike for customer taking with a comparable spike arrangement for last number up storage by the clerk. In at least one known system, that described in the patent to G. R. Hess, No. 2,761,231 which issued September 4, 1956, the chits are stacked on a spike which is suspended at several intermediate points such that removal and loading at opposite ends is possible.

Few, if any, of the prior art dual capacity system customer service devices are adapted for notice to the customer of last number served and for regulated deferral of service to temporarily absent customers. Moreover, many of the prior art devices which string the chits on a rod, such as described in the above mentioned Hess patent, are subject to inherent operational difficulties, in particular, to sporadic jamming at the points of rod support.

It will be appreciated that a customer service device which affords notice to the customer and clerk alike, and which is free of operational difficulties due to temporarily absent customers, support obstructions, or otherwise, is needed and would be welcomed as a significant advancement of the art.

Accordingly:

It is an object of this invention to provide a customer service device for regulating the order of service wherein chits may be moved upon an elongated member without support obstruction.

It is also an object of this invention to provide a customer service device for regulating the order of service whereby temporarily absent customers may be accommodated.

It is another object of this invention to provide a customer service device for regulating the order of service which is relatively simple and economical to produce.

It is still another object of this invention to provide a customer service device for regulating the order of service which enables ready access to chits by both customer and clerk.

It is a further object of this invention to provide a customer service device for regulating the order of service which is sufficiently durable to withstand considerable physical abuse over an extended period of time.

Other objects of the invention will become apparent upon a more comprehensive understanding of the invention for which reference is had to the following specifications and drawings wherein FIGURE 1 depicts a first embodiment of the device of this invention.

FIGURE 2 depicts a second embodiment of the device of this invention.

FIGURE 3 is a cross sectional showing of one member of the embodiment of FIGURE 1 in a modified form.

Briefly, this invention involves a first free-ended horizontal bar member of unique cross section on which the chits are placed for customer taking and a second horizontal bar member of similar cross section which is disposed for use by the clerk as required. The unique cross section of the bars enables support thereof such that the chits may be moved on the bar without support obstruction.

Referring now to the drawings:

FIGURE 1 depicts an embodiment of the present invention which is especially adapted for counter or post mounting wherein a free-ended horizontal bar 11 having a unique inverted T shaped cross section is mounted on a base plate support member 12 by means of two support members 13 and 14 of the standards variety. It will be noted that the standards 13 and 14 are each connected to the horizontal bar at a point uppermost on the upright flange thereof such that chits, as shown at 15, may rest on the bottom flange portion of the bar 11 and be freely moved thereon beneath the standards.

In accordance with this embodiment, the standards 13 and 14 may be L shaped members, as shown, disposed on opposite sides of the horizontal bar 11 with the end of the short section of the L affixed to the bar 11 and the end of the long section of the L affixed to the base plate 12. In the preferred embodiment, a base plate support member 12 of rectangular configuration having a length substantially ⅓ the length of the horizontal bar 11 is shown and the long section of each of the L-shaped members 13 and 14 is affixed thereto at a selected angle with the two inclined toward opposite ends of the bar 11. In consideration of the preponderance of right handed customers, it has been found desirable to incline the member to the right of the bar toward the far end of the horizontal bar.

In this embodiment, a second horizontal bar, 16, having substantially the same cross section as the bar 11 is affixed at one end thereof to one of the support members, in this case the member 13, which is inclined toward the far end of the bar 11 where it is accessible to the clerk and visible to the customer. It will be appreciated, it is not essential that the cross section of the bar 16 and the bar 11 be identical provided, of course, the two are compatible. For example, the bar 16 may have an upright flange of lesser dimension or may omit the upright flange, if desired.

In FIGURE 2, the depicted embodiment is especially adapted for wall mounting. As in the embodiment of FIGURE 1, a free ended horizontal bar 11 having a unique inverted T shaped cross section is mounted on a base plate support member 12 by means of two support members 13 and 14 of the standards variety. In this wall mount embodiment, the support members 13 and 14 which are connected to the upright flange of the bar 11 may be relatively straight members and may be connected to the base plate member 12 in perpendicular relation as shown, if desired. In this embodiment, however, the second horizontal bar 16 is affixed at one end thereof to the base plate support member 12, in perpendicular relation thereto.

It will be noted that in both the FIGURES 1 and 2 embodiments of this invention the upturned flange of the bar 11 serves not only to provide an obstruction free support but also facilitates a convenient instruction panel mounting, as shown at 17.

FIGURE 3 depicts, in cross section, a modified horizontal bar 21 which is particularly suitable for sturdy plastic construction. It will be noted that the horizontal bar 21, which is intended for direct substitution in place of the bar 11 in the embodiments of FIGURES 1 and 2, includes an upturned flange similar to that of the bar 11 which is flared at the bottom edge to support the chits. While the bar 21 is shown as a solid member, it will be appreciated that the bar may be hollowed, if desired.

In operation, the customers take numbered chits in order from the end of the bar 11 closest to them by slightly lifting the chit to be taken and sliding it off the end. Then in typical fashion, the customers each hold their chit until the number indicated thereon is called by the clerk. When the clerk is handed the chit bearing the number just called, he promptly slips the chit on the bar 11 and with this chit he pushes the chit near his end of the bar into the pack and with his return motion brings the chit bearing the last called number back to the end of the bar. Thus the customers can determine by simple observation of the chit dispensing means which number was last served or is currently being served.

In larger stores it is not unusual, when the customer has strayed away to browse or to do other shopping, that the clerk's call is not immediately answered. In this event, the clerk merely calls the next number and instead of moving the last served number into the pack on the bar 11, he places the next number on the bar 16 such that the two numbers before and after the absent chit are visible both to the customer and the clerk at the rear of the chit dispensers. Thus when the absent customer reappears he may be served at the next opportunity and his right to immediate service will not be subject to challenge by the other waiting customers, irrespective of the number of opportunities for service missed by the absent customer.

It will be appreciated that the device of this invention affords free and easy access to the chits both by the customer and the clerk and that the jam-free continuous upright flange insures an orderly chit arrangement on the bar at all times whereby only those chits which are informative of the current status of service are visible to the customer.

Moreover, it has been found that the device of this invention enables a much greater efficiency of service. It will be noted that the system involves no waiting period or other interruption in service in the event a customer is temporarily absent.

In addition, since the chit dispensing means will accommodate absent customers upon their return, it is not essential that the announcement of numbers be heard over a large area and a much quieter and less disturbing operation is possible. Thus several service facilities can be located in relatively close proximity, if desired. It may be advisable in such instances, however, to employ chit dispensing devices having horizontal bar members of different cross section along with chits of different configuration and/or color to avoid confusion between the several service facilities. For example, one device might utilize a horizontal bar member having the inverted T cross section shown in FIGURES 1 and 2 while another device might utilize such a member having the cross section shown in FIGURE 3.

It is understood that the device of this invention may be constructed of a variety of different materials and may be assembled by any means compatible therewith. Moreover, it is recognized that the support plate member 12 in the embodiment of FIGURE 1 may be adapted for other than counter or post mounting and that it is not critical to this invention that the support plate be disposed beneath or to one side of the horizontal bar member as shown in the several embodiments.

The device of this invention is not restricted to the several exemplary embodiments and it is within the purview of this disclosure to make such substitutions and/or modification as would be readily apparent to those skilled in the art.

Finally, this invention is to be limited only by the scope of the claim appended hereto.

What is claimed is:

A customer service device for dispensing service chits having a predetermined order of identity comprising a first horizontal bar member having a substantially uniform cross section with an upright narrow flange portion and a relatively broad lower portion; a base plate support member adapted for adherence to a selected surface; at least one other support member of the standards variety interconnecting said base plate support member and said upright flange portion of said first horizontal bar member; and a second horizontal bar member having a substantially uniform cross section with at least said relatively broad portion, said second horizontal bar member having one end thereof connected to one of said support members and one end free, arranged to supportingly receive chits having a cut out portion compatible with the cross-section thereof via said free end, said support member interconnecting said base plate support member and said upright flange being affixed to the uppermost portion of said upright flange such that chits having a cutout portion compatible with the cross-section of said horizontal bar members may be moved thereon.

References Cited by the Examiner
UNITED STATES PATENTS

| | | | |
|---|---|---|---|
| 1,343,423 | 6/1920 | Todd | 40—19.5 |
| 1,882,015 | 10/1932 | Huebsch | 40—19.5 |
| 2,761,231 | 9/1956 | Hess | 40—19.5 |

EUGENE R. CAPOZIO, *Primary Examiner.*

WENCELSO J. CONTRERAS, *Assistant Examiner.*